US010893349B2

(12) United States Patent
Green, III et al.

(10) Patent No.: US 10,893,349 B2
(45) Date of Patent: Jan. 12, 2021

(54) WIRELESS MICROPHONE COMPRISING A PLURALITY OF ANTENNAS

(71) Applicant: ALTEROS, INC., Stow, OH (US)

(72) Inventors: Robert T. Green, III, Streetsboro, OH (US); Brian K. Fair, Boyds, MD (US); Jacquelynn A. Green, Streetsboro, OH (US)

(73) Assignee: Audio-Technica U.S., Inc., Stow, OH (US)

(*) Notice: Subject to any disclaimer, the term of this patent is extended or adjusted under 35 U.S.C. 154(b) by 0 days.

(21) Appl. No.: 16/370,540

(22) Filed: Mar. 29, 2019

(65) Prior Publication Data

US 2019/0306602 A1  Oct. 3, 2019

Related U.S. Application Data

(60) Provisional application No. 62/650,890, filed on Mar. 30, 2018.

(51) Int. Cl.
| | | |
|---|---|---|
| *H04R 1/08* | (2006.01) | |
| *H01Q 1/27* | (2006.01) | |
| *H01Q 1/48* | (2006.01) | |
| *H01Q 21/00* | (2006.01) | |
| *H01Q 1/22* | (2006.01) | |
| *H04B 7/06* | (2006.01) | |
| *H04B 5/00* | (2006.01) | |

(52) U.S. Cl.
CPC ............. *H04R 1/08* (2013.01); *H01Q 1/273* (2013.01); *H01Q 1/48* (2013.01); *H01Q 21/00* (2013.01); *H01Q 1/2291* (2013.01); *H04B 5/0012* (2013.01); *H04B 7/0608* (2013.01); *H04R 2420/07* (2013.01)

(58) Field of Classification Search
CPC .. H04B 7/0608; H04B 5/0012; H01Q 1/2291; H01Q 1/273; H01Q 1/48; H01Q 21/00; H04R 1/08; H04R 2420/07
See application file for complete search history.

(56) References Cited

U.S. PATENT DOCUMENTS

| | | | |
|---|---|---|---|
| 2007/0168819 A1* | 7/2007 | Buhe ..................... | H04R 1/005 714/746 |
| 2007/0222681 A1* | 9/2007 | Greene .................. | H02J 50/10 343/700 MS |
| 2007/0238496 A1* | 10/2007 | Chung ................. | H04B 1/3838 455/575.7 |

(Continued)

FOREIGN PATENT DOCUMENTS

JP  2006148948 A  *  6/2006

*Primary Examiner* — Davetta W Goins
*Assistant Examiner* — Kuassi A Ganmavo
(74) *Attorney, Agent, or Firm* — Sherman IP LLP; Kenneth L. Sherman; Hemavathy Perumal

(57) ABSTRACT

One embodiment provides a wireless microphone comprising a microphone body a plurality of antennas positioned at different locations of the microphone body. Each of the plurality of antennas is configured to wirelessly transmit data. The wireless microphone further comprises a sensor configured to detect an object within proximity of an antenna of the plurality of antennas that obstructs the antenna, and a controller configured to switch antenna operation of the wireless microphone from the antenna to another antenna of the plurality of antennas in response to the object detected.

20 Claims, 9 Drawing Sheets

(56) References Cited

U.S. PATENT DOCUMENTS

| | | | | |
|---|---|---|---|---|
| 2007/0252827 | A1* | 11/2007 | Hirota | G06F 1/162 |
| | | | | 345/204 |
| 2009/0115668 | A1* | 5/2009 | Abe | H01Q 1/243 |
| | | | | 343/702 |
| 2009/0295648 | A1* | 12/2009 | Dorsey | H01Q 1/2266 |
| | | | | 343/702 |
| 2010/0295738 | A1* | 11/2010 | Alameh | H01Q 1/241 |
| | | | | 343/702 |
| 2011/0193752 | A1* | 8/2011 | Wang | H01Q 1/242 |
| | | | | 343/702 |
| 2012/0163635 | A1* | 6/2012 | Szopko | H01Q 1/38 |
| | | | | 381/174 |
| 2014/0361931 | A1* | 12/2014 | Irci | H01Q 9/0421 |
| | | | | 343/702 |
| 2015/0010160 | A1* | 1/2015 | Udesen | H04R 25/70 |
| | | | | 381/60 |
| 2015/0078599 | A1* | 3/2015 | Sundberg | H01Q 1/40 |
| | | | | 381/315 |
| 2015/0245134 | A1* | 8/2015 | Liu | H04R 1/44 |
| | | | | 381/334 |
| 2016/0218439 | A1* | 7/2016 | Fasenfest | H01Q 9/0407 |
| 2017/0149121 | A1* | 5/2017 | Zachara | H01Q 5/357 |
| 2017/0365910 | A1* | 12/2017 | Zachara | H01Q 5/50 |
| 2018/0219292 | A1* | 8/2018 | Kenkel | H01Q 9/0414 |
| 2018/0269586 | A1* | 9/2018 | Kawahata | H01Q 1/3233 |
| 2019/0159001 | A1* | 5/2019 | Wang | H04M 1/6066 |

* cited by examiner

WIRELESS MICROPHONE COMPRISING A PLURALITY OF ANTENNAS

CROSS REFERENCE TO RELATED APPLICATIONS

This application claims priority from U.S. Provisional Patent Application Ser. No. 62/650,890, filed on Mar. 30, 2018, incorporated herein by reference.

TECHNICAL FIELD

One or more embodiments relate generally to wireless microphones, and in particular, a wireless microphone comprising a plurality of antennas.

BACKGROUND

A wireless electronic device may be used to wirelessly transmit data to one or more other electronic devices (e.g., another wireless electronic device, a non-wireless electronic device, etc.) without use of a physical cable. A wireless microphone is an example wireless electronic device used for wirelessly transmitting data (e.g., sound) to one or more other electronic devices, such as an amplifier, a recording device, or any other type of broadcast/media device/system. Wireless microphones may operate in various different spectrum bands. Wireless microphones may be designed to operate on a discrete set of frequencies within a spectrum band, or they may cover an entire range of frequencies in the band. Examples of wireless microphones include, but are not limited to, hand-held or body-worn wireless microphones, in-ear monitors, media devices used for cueing on-air talent, intercom systems for backstage communications, etc.

SUMMARY

One embodiment provides a wireless microphone comprising a microphone body a plurality of antennas positioned at different locations of the microphone body. Each of the plurality of antennas is configured to wirelessly transmit data. The wireless microphone further comprises a sensor configured to detect an object within proximity of an antenna of the plurality of antennas that obstructs the antenna, and a controller configured to switch antenna operation of the wireless microphone from the antenna to another antenna of the plurality of antennas in response to the object detected.

Another embodiment provides a wireless microphone system. The wireless microphone system comprises a microphone body, a first antenna positioned at a first location of the microphone body, and a second antenna positioned at a second location of the microphone body that is different from the first location. Each antenna of the wireless microphone system is configured to wirelessly transmit data. The wireless microphone system further comprises a sensor configured to capture sensor information indicative of an object within proximity of an antenna of the wireless microphone system that obstructs the antenna, and a controller configured to switch antenna operation of the wireless microphone system between the first antenna and the second antenna based on the sensor information.

One embodiment provides a method comprising detecting, via a sensor, an object within proximity of a first antenna of a wireless microphone that obstructs the first antenna. The method further comprises switching antenna operation of the wireless microphone from the first antenna to a second antenna of the wireless microphone in response to the object detected. The first antenna and the second antenna are positioned at different locations of the wireless microphone.

These and other features, aspects and advantages of the present invention will become understood with reference to the following description, appended claims and accompanying figures.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

Figure 1:
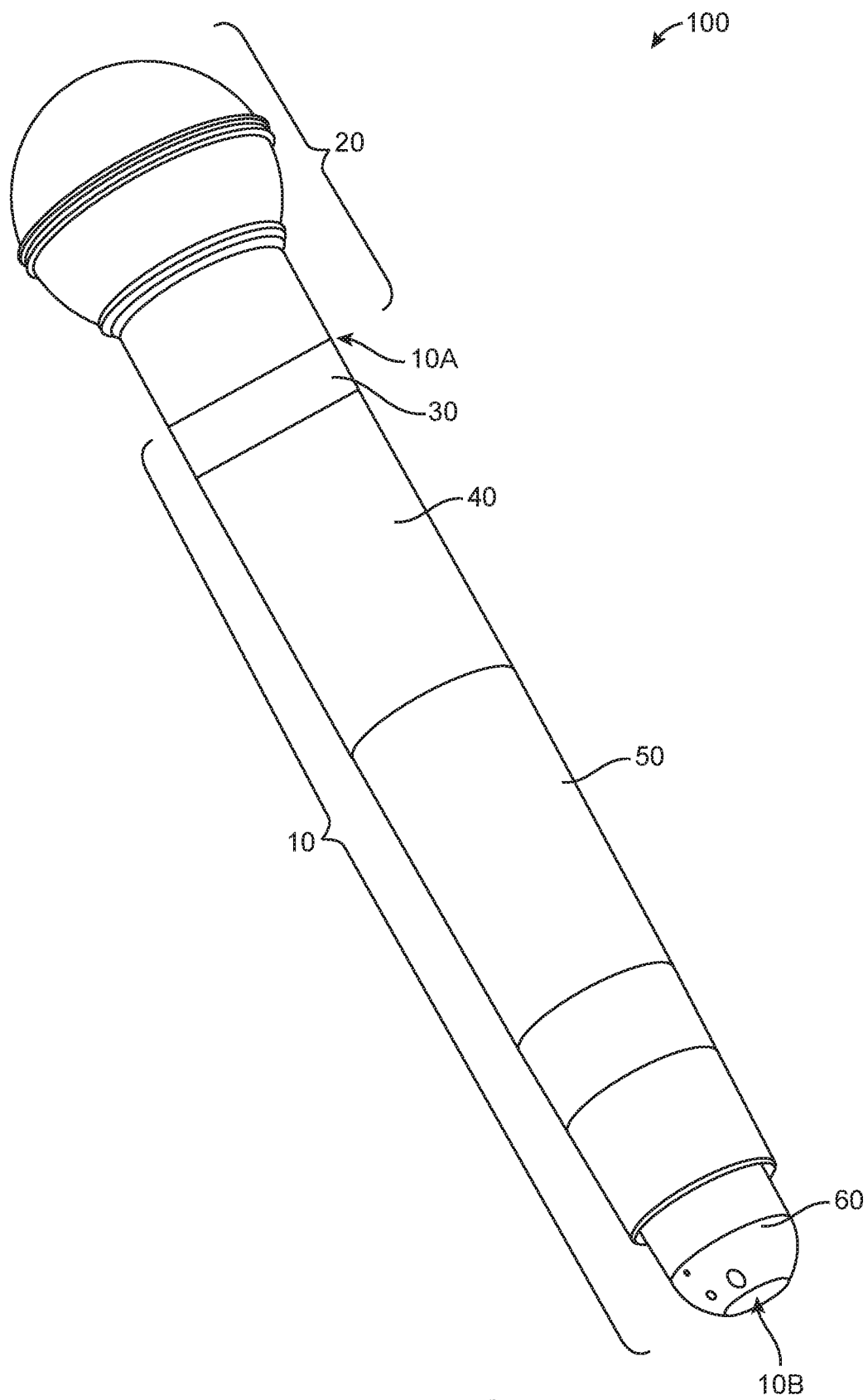
FIG. 1 illustrates an example wireless microphone, in accordance with one embodiment.

The detailed description explains the preferred embodiments of the invention together with advantages and features, by way of example with reference to the drawings.

DETAILED DESCRIPTION

One or more embodiments relate generally to digital media networking, and in particular, a wireless microphone comprising a plurality of antennas. One embodiment provides a wireless microphone comprising a microphone body a plurality of antennas positioned at different locations of the microphone body. Each of the plurality of antennas is configured to wirelessly transmit data. The wireless microphone further comprises a sensor configured to detect an object within proximity of an antenna of the plurality of antennas that obstructs the antenna, and a controller configured to switch antenna operation of the wireless microphone from the antenna to another antenna of the plurality of antennas in response to the object detected.

Another embodiment provides a wireless microphone system. The wireless microphone system comprises a microphone body, a first antenna positioned at a first location of the microphone body, and a second antenna positioned at a second location of the microphone body that is different from the first location. Each antenna of the wireless microphone system is configured to wirelessly transmit data. The wireless microphone system further comprises a sensor configured to capture sensor information indicative of an object within proximity of an antenna of the wireless microphone system that obstructs the antenna, and a controller configured to switch antenna operation of the wireless microphone system between the first antenna and the second antenna based on the sensor information.

One embodiment provides a method comprising detecting, via a sensor, an object within proximity of a first antenna of a wireless microphone that obstructs the first antenna. The method further comprises switching antenna operation of the wireless microphone from the first antenna to a second antenna of the wireless microphone in response to the object detected. The first antenna and the second antenna are positioned at different locations of the wireless microphone.

As a physical size of a wireless microphone is small, the number of antennas that may be included in the wireless microphone is limited due to lack of available space. Further, if a wireless microphone has a conductive housing, the number of locations available in the wireless microphone for placement of an antenna is limited. Typically, an antenna is integrated into a bottom of the microphone. This is not an ideal location for placement of the antenna as the antenna may be easily obstructed. For example, antenna obstruction may occur when a user's hand holds the bottom of the microphone. Antenna obstruction affects radio frequency (RF) operation of the antenna, resulting in a drop in signal quality of the antenna One or more embodiments of the invention may be used in wireless microphone systems, wireless systems, public address systems, and other professional audio systems. One or more embodiments of the invention provide a wireless microphone comprising a plurality of antennas placed at different physical locations in the microphone. The wireless microphone is configured to switch between the antennas to reduce effects of antenna obstruction and provide improved signal quality.

FIG. 1 illustrates an example wireless microphone 100, in accordance with one embodiment. The wireless microphone 100 comprises a microphone body 10 and a microphone head 20 including a microphone unit. In one embodiment, the microphone body 10 is substantially elongated and has a substantially cylindrical/tubular shape. In another embodiment, the microphone body 10 has a different shape.

Figure 3:
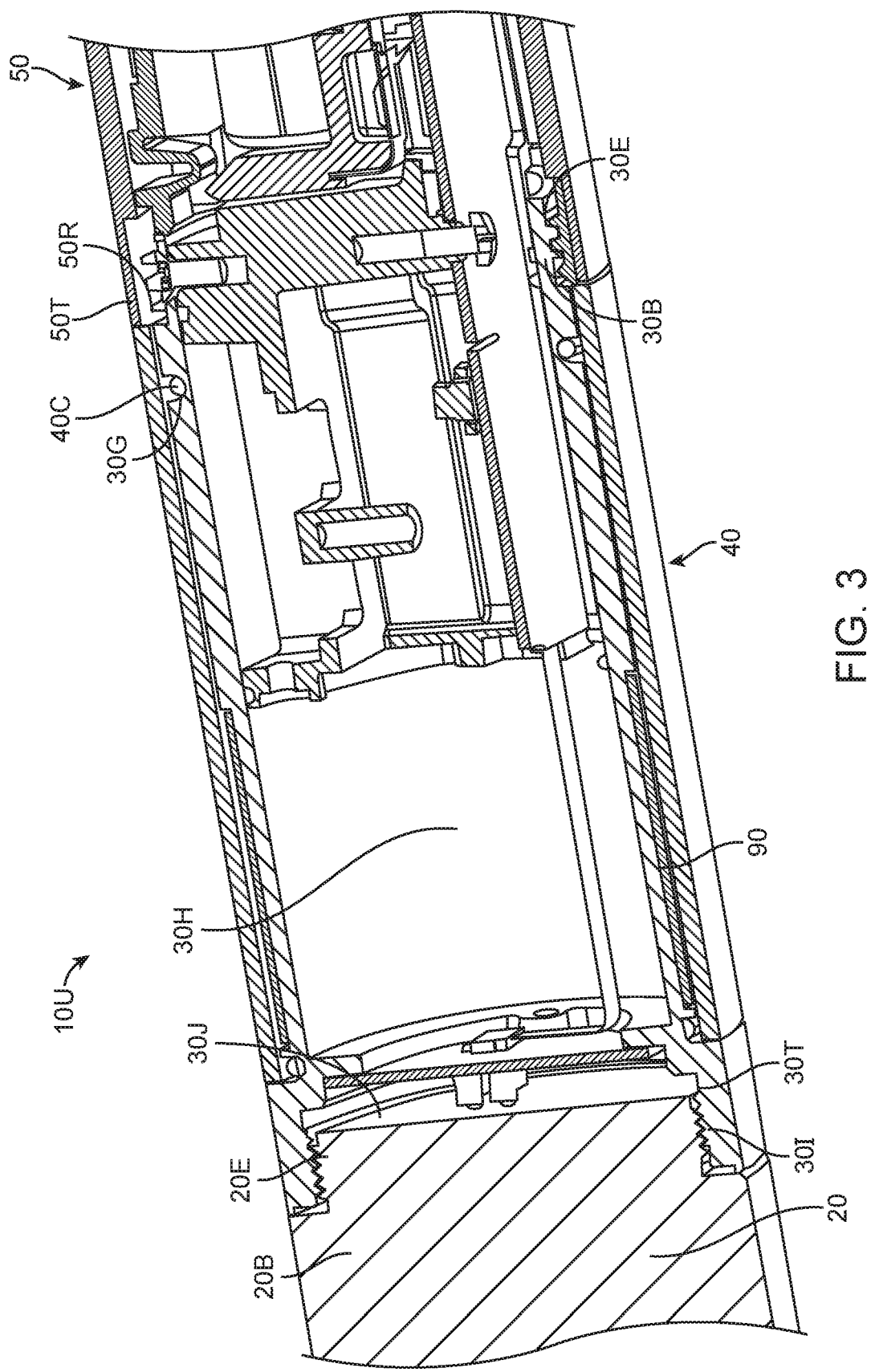
FIG. 3 illustrates a cross-section of an upper portion of a microphone body of the wireless microphone, in accordance with one embodiment.

In one embodiment, the microphone body 10 includes a lower portion (i.e., bottom portion) 10L (FIG. 6) and upper portion (i.e., top portion) 10U (FIG. 3). A bottom end 10B of the microphone body 10 is located at one end of the lower portion 10L. A top end 10A of the microphone body is located at one end of the upper portion 10U.

The microphone 100 comprises a plurality of antennas integrated in the microphone body 10 at different physical locations. In one embodiment, the plurality of antennas comprise at least the following: (1) a first antenna component (i.e., member) 70 integrated in the lower portion 10L, and (2) a second antenna component 80 integrated in the upper portion 10U. For example, in one embodiment, the first antenna component 70 is proximate to and integrated in the bottom end 10B of the microphone body 10, and the second antenna component 80 is proximate to and integrated in the top end 10A of the microphone body 10.

In one embodiment, the first antenna component 70 operates as a primary antenna for the wireless microphone 100, and the second antenna component 80 operates as a secondary antenna for the wireless microphone 100.

The microphone body 10 comprises one or more detachable, individual sections. In one embodiment, the microphone body 10 comprises a housing section 30 configured to detachably couple with the microphone head 20. In one embodiment, the housing section 30 has a substantially cylindrical body. In another embodiment, the housing section 30 has a different shape/outline.

The microphone body 10 comprises a plurality of cover sections of different materials. Each cover section is removable and adapted to interfit with the housing section 30 and/or another cover section to form a microphone casing that serves as a microphone grip for the microphone body 10. In one embodiment, the plurality of cover sections include a first cover section 40 that is non-conductive, a second cover section 50 that is conductive, and a third cover section 60 that is non-conductive. In one embodiment, the cover sections 40, 50, and 60 are arranged serially along a length of the microphone body 10.

Figure 2:
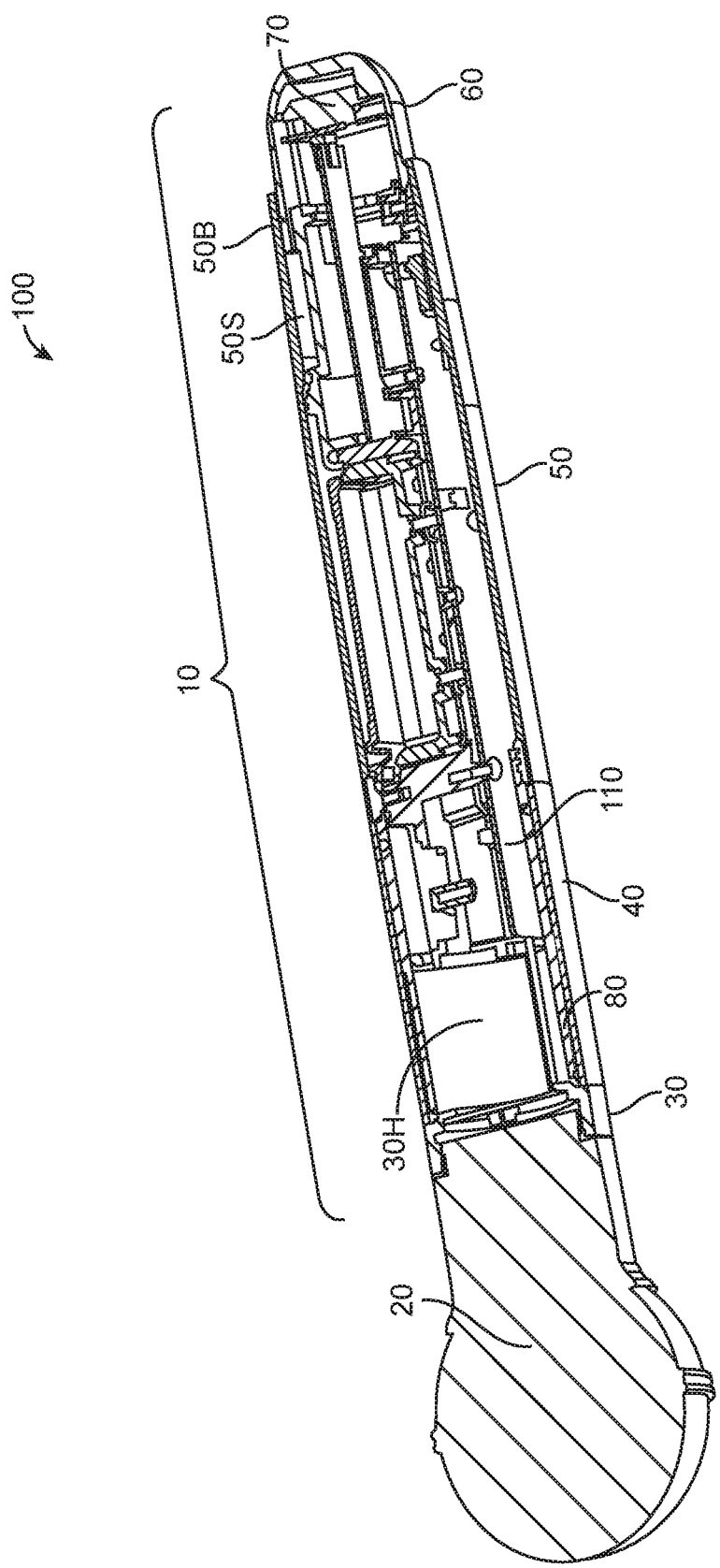
FIG. 2 illustrates a cross-section of the wireless microphone, in accordance with one embodiment.

FIG. 2 illustrates a cross-section of the wireless microphone 100, in accordance with one embodiment. In one embodiment, the housing section 30 comprises an interior space 30H for maintaining one or more operative components (i.e., parts) of the wireless microphone 100 inside the housing section 30, such as, but not limited to, a circuit assembly 110 including one or more circuitry/electronic components that enable operation of the wireless microphone 100.

FIG. 3 illustrates a cross-section of the upper portion 10U of the microphone body 10, in accordance with one embodiment. The housing section 30 has a pair of opposing ends including a top end 30T and a bottom end 30B. The top end 30T is designed to detachably couple with a bottom end 20B of the microphone head 20. In one embodiment, the top end 30T comprises a recess 30J shaped for receiving the bottom end 20B, and an attachment mechanism (i.e., connection mechanism or coupling mechanism) for engaging with an attachment mechanism of the bottom end 20B. For example, in one embodiment, the top end 30T comprises a set of threads 30I on its inner surface, and the bottom end 20B comprises a complimentary set of threads 20E on its outer surface. The threads 30I engage threadedly with the threads 20E to securely retain the bottom end 20B within the recess 30J. Other attachment mechanisms may be used, such as fasteners or connectors like screws, snaps, studs, male/female connectors, magnets, etc. Each of these attachment mechanisms may be used alone or in combination with other attachment mechanisms.

In one embodiment, the first cover section 40 is comprised of one or more non-conductive materials such as, but not limited to, plastic, rubber, etc. The first cover section 40 serves as a sleeve configured to detachably couple to the housing section 30 to enclose a portion of the housing section 30 and the second antenna component 80 disposed in between the first cover section 40 and the housing section 30. In one embodiment, the first cover section 40 has a shape that substantially matches a shape of the housing section 30. For example, in one embodiment, both the first cover section 40 and the housing section 30 have a substantially cylindrical/tubular shape.

In one embodiment, the second cover section 50 is comprised of one or more conductive materials such as, but not limited to, metal, etc. The second cover section 50 is configured to detachably couple to the housing section 30 to enclose a portion of the housing section 30 that is not already covered by the first cover section 40. For example, in one embodiment, the second cover section 50 encloses the bottom end 30B of the housing section 30, and extends lengthwise beyond the bottom end 30B to further enclose one or more operative components of the wireless microphone 100 such as, but not limited to, one or more cables (e.g., one or more cables interconnecting the first antenna component 70 with the second antenna component 80), a battery holding assembly, etc.

In one embodiment, the second cover section 50 has a substantially cylindrical/tubular shape that narrows with regards to its diameter from a top end 50T of the second cover section 50 towards a bottom end 50B of the second cover section 50 (i.e., an upper portion of the second cover section 50 is wider than a lower portion of the second cover section 50).

In one embodiment, the second cover section 50 comprises an attachment mechanism for engaging with an attachment mechanism of the housing section 30. For example, in one embodiment, the second cover section 50 comprises a set of spaced apart rib members 50R on an inner surface of its top end 50T, and the housing section 30 comprises a complimentary set of locking grooves (i.e., latching grooves) 30E on the outer surface 30A of its bottom end 30B. The rib members 50R engage/interlock with the locking grooves 30E to secure the second cover section 40 against the housing section 30. Other attachment mechanisms may be used, such as fasteners or connectors like screws, snaps, studs, male/female connectors, magnets, etc. Each of these attachment mechanisms may be used alone or in combination with other attachment mechanisms.

The third cover section 60 forms the bottom end 10B of the microphone body 10. In one embodiment, the third cover section 60 is comprised of one or more non-conductive materials such as, but not limited to, plastic, rubber, etc.

Figure 4:
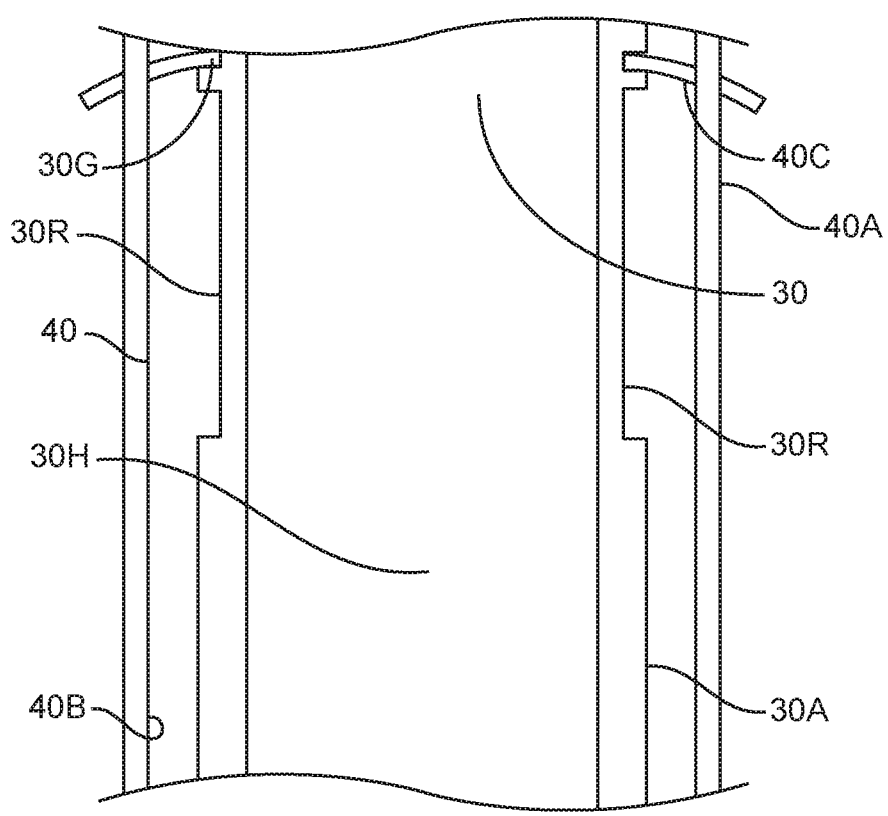
FIG. 4 illustrates a top view of a cross-section of a housing section and a first cover section of the microphone body, in accordance with one embodiment.

FIG. 4 illustrates a top view of a cross-section of the housing section 30 and the first cover section 40, in accordance with one embodiment. In one embodiment, the first cover section 40 comprises a pair of opposing surfaces including an outer surface 40A and an inner surface 40B, and the housing section 30 includes an outer surface 30A. The surfaces 40A, 40B of the first cover section 40 are shaped to substantially match a shape/outline of the outer surface 30A of the housing section 30. In one embodiment, the surfaces 40A, 40B are curved to substantially match a curvature of the outer surface 30A.

The inner surface 40B of the first cover section 40 is configured to detachably couple to the outer surface 30A of the housing section 30 to enclose a portion of the housing section 30 (e.g., a portion of the housing section 30 extending between the ends 30T and 30B). In one embodiment, the first cover section 40 comprises an attachment mechanism for engaging with an attachment mechanism of the housing section 30. For example, in one embodiment, the first cover section 40 comprises one or more projecting strips (i.e., latching strips) 40C arranged on the inner surface 40B, and the housing section 30 comprises one or more complimentary locking grooves (i.e., latching grooves) 30G arranged on the outer surface 30A. Each projecting strip 40C is configured to engage/interlock with a complimentary locking groove 30G to secure the first cover section 40 against the housing section 30. Other attachment mechanisms may be used, such as fasteners or connectors like screws, snaps, studs, male/female connectors, magnets, etc. Each of these attachment mechanisms may be used alone or in combination with other attachment mechanisms.

In one embodiment, the second antenna component 80 is integrated inside the microphone body 10. For example, in one embodiment, the outer surface 30A of the housing section 40 includes a recess 30R configured to receive and maintain the second antenna component 80 (for ease of illustration, the second antenna component 80 is not shown in FIG. 4). The second antenna component 80 is disposed inside the recess 30R, interposed between the outer surface 30A and the inner surface 40B of the first cover section 40. The second antenna component 80 is positioned adjacent to an interior (i.e., the inner surface 40B) of the first cover section 40 and further positioned adjacent to an exterior (i.e., the outer surface 30A) of the housing section 30. In one embodiment, the second antenna component 80 is wrapped around a portion of the exterior (i.e., the outer surface 30A) of the housing section 30.

Figure 5:
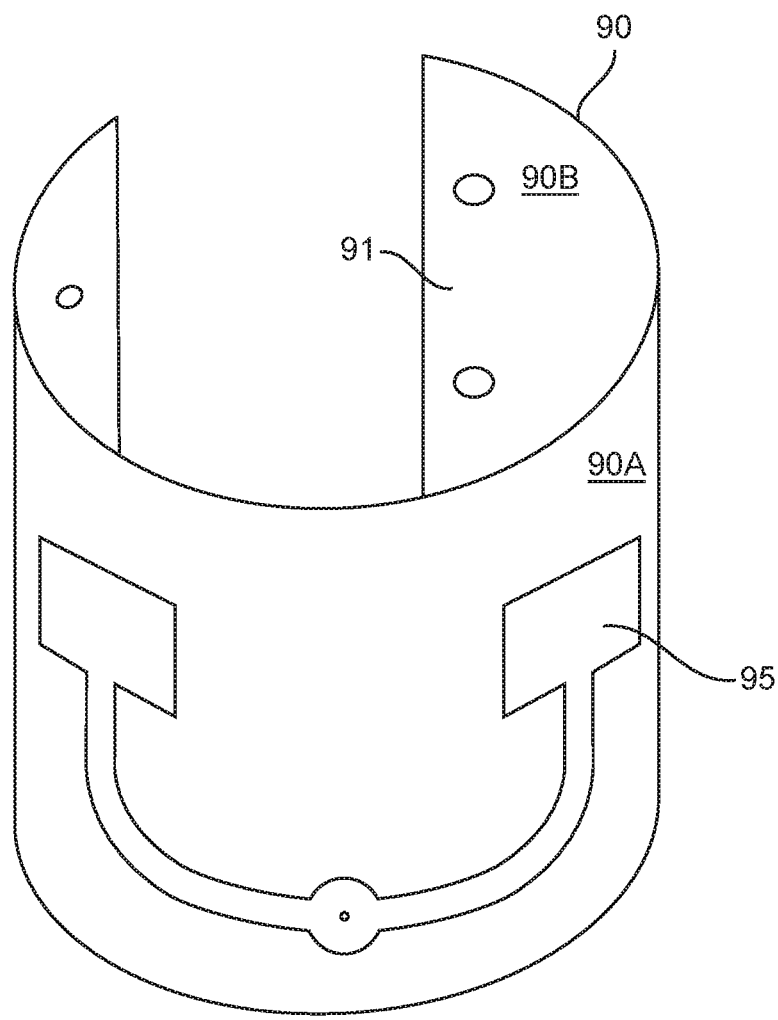
FIG. 5 illustrates an example antenna, in accordance with one embodiment.

FIG. 5 illustrates an example second antenna component 80, in accordance with one embodiment. In one embodiment, the second antenna component 80 comprises an array of antennas. For example, in one embodiment, the second antenna component 80 comprises a flexible ("flex") PCB 90 with a pair of opposing sides including a first side 90A (e.g., front surface) and a second side 90B (e.g., rear surface). The flex PCB 90 comprises a planar array of microstrip antenna elements 95 disposed on the first side 90A. The antenna elements 95 are arranged on the flex PCB 90 such that an antenna element 95 is positioned adjacent to any side surface of the microphone body 10. In one embodiment, the antenna elements 95 are integrated in a ground plane. For example, in one embodiment, the flex PCB 90 comprises a ground plane 91 disposed on the second side 90B for each antenna element 95.

The flex PCB 90 is sized and shaped to fit inside the recess 30R of the housing section 30, such that the flex PCB 90 is sandwiched in between the interior (i.e., the inner surface 40B) of the first cover section 40 and the exterior (i.e., the outer surface 30A) of the housing section 30. In one embodiment, the flex PCB 90 is shaped to substantially match a shape/outline of the recess 30R and the inner surface 40B of the first cover section 40, thereby securely retaining the flex PCB 90 inside the recess 30R when the first cover section 40 is coupled to the housing section 30. For example, in one embodiment, the flex PCB 90 is curved to substantially match a curvature of the recess 30R and the inner surface 40B of the first cover section 40, as shown in FIG. 3. As further shown in FIG. 3, the flex PCB 90 is wrapped around a portion of the exterior (i.e., the outer surface 30A) of the housing section 30.

Figure 6:
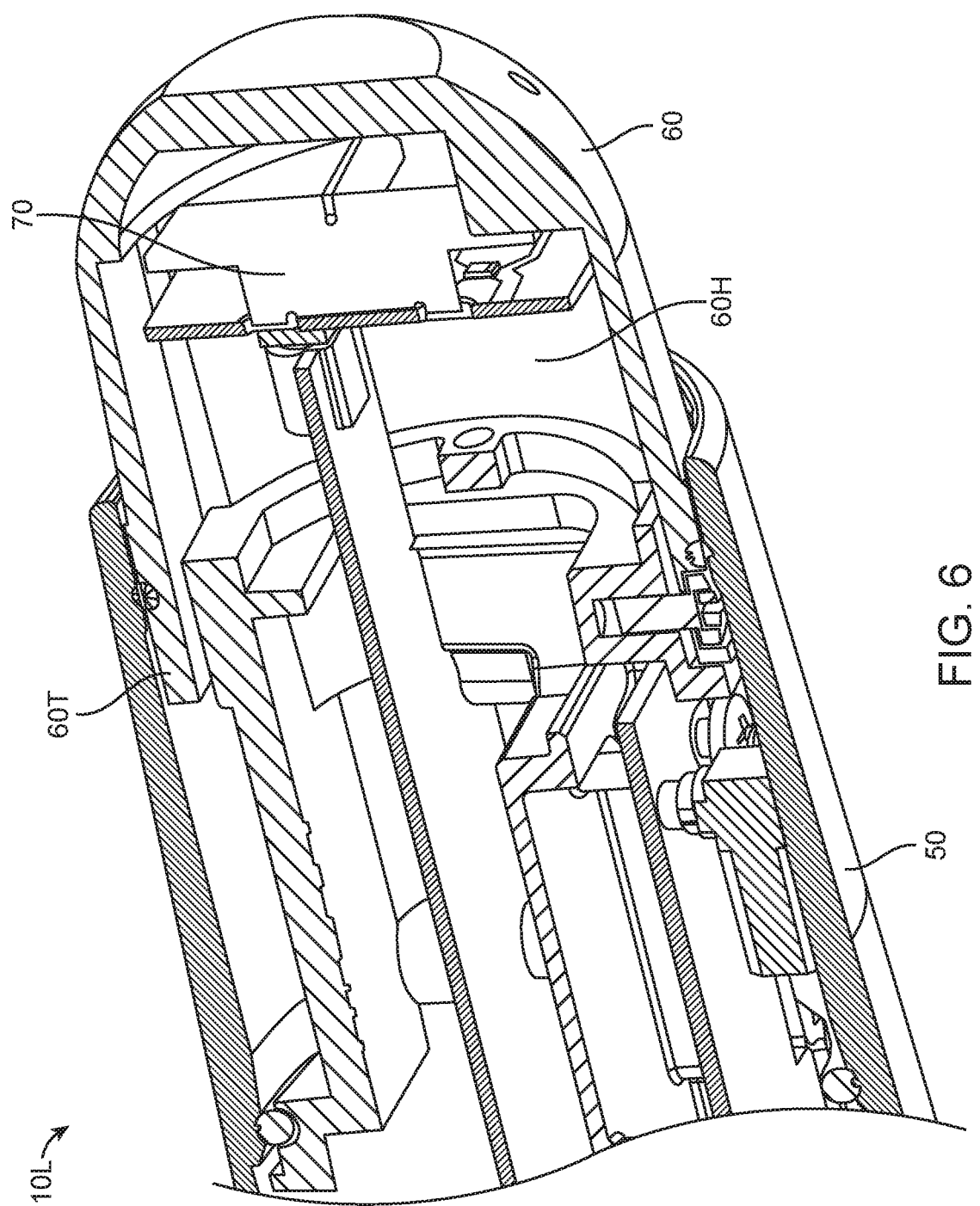
FIG. 6 illustrates a cross-section of a lower portion of the microphone body, in accordance with one embodiment.

FIG. 6 illustrates a cross-section of the lower portion 10L of the microphone body 10, in accordance with one embodiment. The third cover section 60 is configured to detachably interlock with the second cover section 50 to enclose one or more operative components of the wireless microphone 100 such as, but not limited to, the first antenna component 70. The third cover section 60 comprises an interior space 60H for maintaining the one or more operative components enclosed by the third cover section 60.

In one embodiment, the third cover section 60 comprises an attachment mechanism for engaging with an attachment mechanism of the second cover section 50. For example, in one embodiment, the second cover section 50 may comprise one or more stop members 50S on an inner surface of its bottom end 50B that a top end 60T of the third cover section 60 may abut/rest against. Other attachment mechanisms may be used, such as fasteners or connectors like screws, snaps, studs, male/female connectors, magnets, etc. Each of these attachment mechanisms may be used alone or in combination with other attachment mechanisms.

Figure 7:
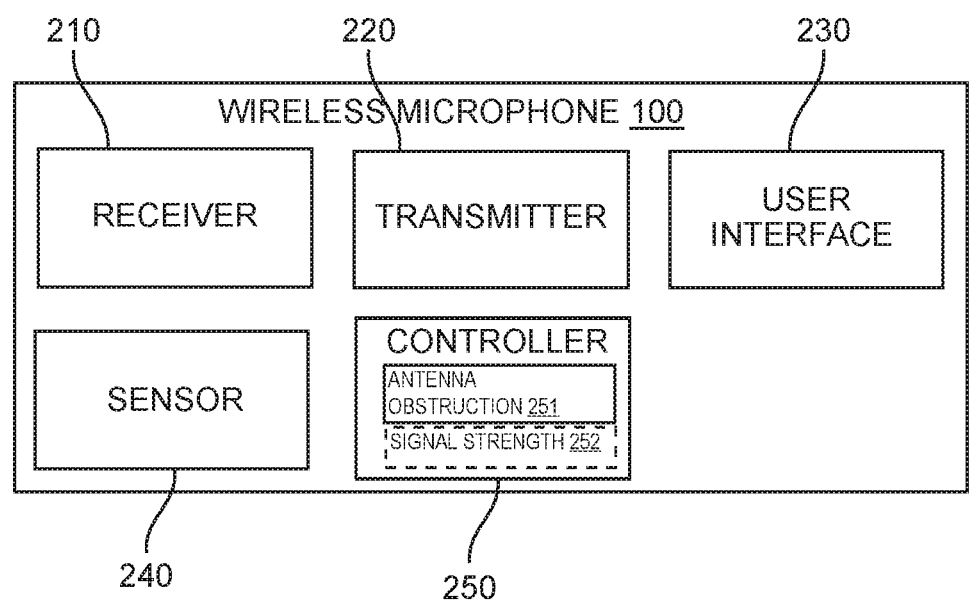
FIG. 7 is a block diagram of the wireless microphone, in accordance with one embodiment.

FIG. 7 is a block diagram of the wireless microphone 100, in accordance with one embodiment. In one embodiment, the wireless microphone 100 comprises one or more of the following components: (1) a receiver 210 for wirelessly receiving data/signals (e.g., control commands from a remote transceiver, time synchronization information, information for changing one or more parameters/settings of the wireless microphone 100), (2) a transmitter 220 including the first antenna component 70 and the second antenna component 80 for wirelessly transmitting data/signals (e.g., audio data/signals captured by the microphone head 20), (3) a user interface (UI) 230 for configuring one or more parameters/settings of the wireless microphone 100, (4) at least one sensor 240 for detecting an object (e.g., a human body part such as a hand, metal, etc.) within proximity of at least one antenna (i.e., the first antenna component 70 and/or the second antenna component 90) of the wireless microphone 100, wherein the object detected obstructs the at least one antenna (i.e., affects performance of the at least one antenna by degrading signal quality of the at least one antenna), and (5) a controller 250 including software and/or hardware (e.g., processor) for controlling one or more operations of the wireless microphone 100, such as antenna operation of the wireless microphone 100 (i.e., which of the different antennas of the wireless microphone 100 to utilize to wireless transmit data/signals).

Antenna obstruction results in a loss of data/signal link with an antenna. In one embodiment, each antenna component 70, 80 has a corresponding sensor 240. In another embodiment, only one of the first antenna component 70 and the second antenna component 50 has a corresponding sensor 240. Each sensor 240 is configured to detect an object within proximity of a corresponding antenna (e.g., the first antenna component 70 or the second antenna component 80) that obstructs the antenna, such as a user's hand, a clothing item of the user, or some other object that blocks the antenna. For example, if a user's hand is placed at the bottom end 10B of the microphone body 10, the placement of the user's hand negatively impacts antenna operation of the first antenna component 70, resulting in a degradation in performance (i.e., signal quality) of the first antenna component 70.

In one embodiment, each sensor 240 comprises a touch sensor or another type of tactile sensor configured to detect a physical contact/interaction with a corresponding antenna. In another embodiment, each sensor 240 comprises a proximity sensor configured to detect presence of a nearby object without any physical contact with a corresponding antenna.

In one embodiment, the controller 250 implements antenna switching (i.e., switching/toggling antenna operation between the different antennas of the wireless microphone 100) to reduce effects of antenna obstruction and provide improved performance (i.e., signal quality). In one embodiment, the controller 250 is configured to implement antenna switching utilizing one or more methods other than measuring/monitoring performance of an antenna (i.e., antenna components 70, 80). For example, in one embodiment, the controller 250 comprises an antenna obstruction unit 251 configured to implement antenna switching based on sensor information captured by the at least one sensor 240. If the sensor information is indicative of an object within proximity of the first antenna component 70 (e.g., a user's hand placed at the bottom end 10B of the microphone body 10), the antenna obstruction unit 251 is configured to switch the antenna operation from the first antenna component 70 to the second antenna component 80. If the sensor information is indicative of an object within proximity of the second antenna component 70 instead (e.g., a user holds the upper portion 10U of the microphone body 10 with both hands), the antenna obstruction unit 251 is configured to switch the antenna operation from the second antenna component 80 to the first antenna component 70.

In one embodiment, at least one component in FIG. 7 is coupled to or integrated in the microphone body 10. For example, in one embodiment, the UI 230 is disposed inside the microphone body 10 and is accessed by removing the second cover section 50.

In one embodiment, the controller 250 comprises an optional signal strength unit 252 configured to measure/monitor performance of an antenna (i.e., the first antenna component 70 and/or the second antenna component 80), and implement antenna switching based on the performance. For example, in one embodiment, the signal strength unit 252 implements antenna switching based on signal quality of a RF link with one of the antenna components 70, 80. If the signal strength unit 252 monitors signal quality of a RF link with the first antenna component 70 and determines that the signal quality is below a pre-determined threshold (i.e., there is a reduction in signal strength), the signal strength unit 252 is configured to switch the antenna operation from the first antenna component 70 to the second antenna component 70. With the signal strength unit 252, the controller 250 can implement antenna switching based on both sensor information captured by the at least one sensor 240 and signal strength of the antenna components 70, 80.

In one embodiment, the wireless microphone 100 is implemented as a digital wireless microphone that utilizes digital wireless technology for transmission. In another embodiment, the wireless microphone 100 is implemented as analog wireless microphone that utilizes traditional analog wireless technology for transmission (e.g., transmitting analog audio via RF with frequency modulation (FM)).

Figure 8:
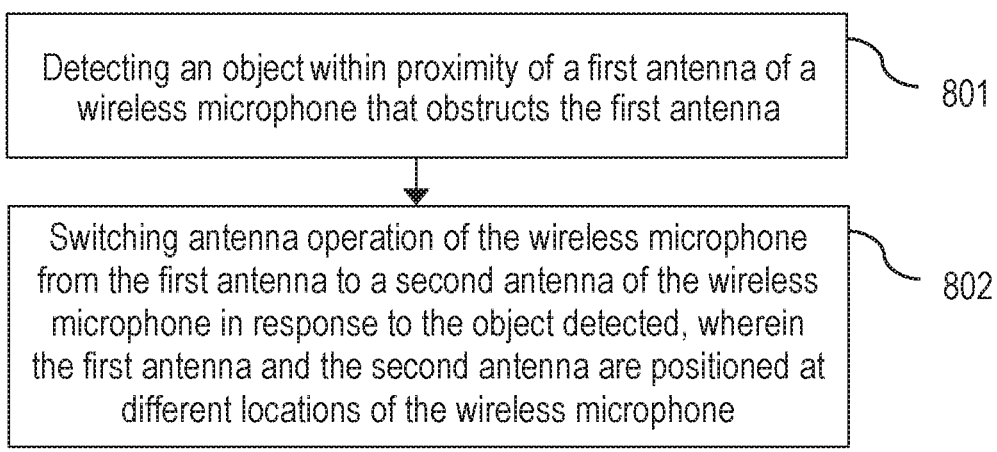
FIG. 8 illustrates a flowchart of an example process for implementing antenna switching in a wireless microphone, in accordance with one embodiment.

FIG. 8 illustrates a flowchart of an example process 800 for implementing antenna switching in a wireless microphone, in accordance with one embodiment. Process block 801 includes detecting an object within proximity of a first antenna (e.g., antenna component 70) of a wireless microphone (e.g., wireless microphone 100) that obstructs the first antenna. Process block 802 includes switching antenna operation of the wireless microphone from the first antenna to a second antenna (e.g., antenna component 80) of the wireless microphone, wherein the first antenna and the second antenna are positioned at different locations of the wireless microphone.

In one embodiment, process blocks 801-802 may be performed utilizing one or more components of the wireless microphone 100, such as the antenna obstruction unit 251.

Figure 9:
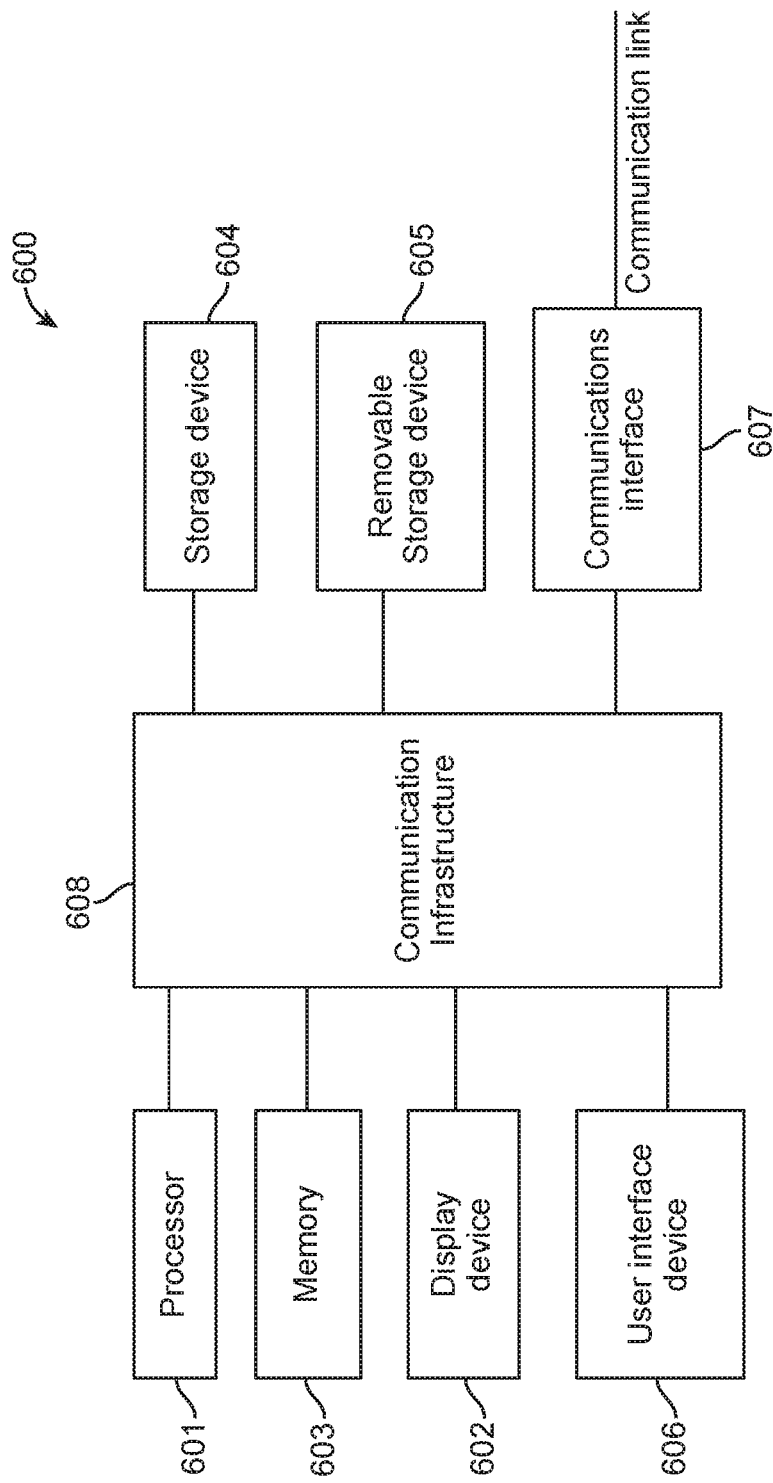
FIG. 9 is a high-level block diagram showing an information processing system comprising a computer system useful for implementing the disclosed embodiments.

FIG. 9 is a high-level block diagram showing an information processing system comprising a computer system 600 useful for implementing the disclosed embodiments. The computer system 600 includes one or more processors 601, and can further include an electronic display device 602 (for displaying video, graphics, text, and other data), a main memory 603 (e.g., random access memory (RAM)), storage device 604 (e.g., hard disk drive), removable storage device 605 (e.g., removable storage drive, removable memory module, a magnetic tape drive, optical disk drive, computer readable medium having stored therein computer software and/or data), user interface device 606 (e.g., keyboard, touch screen, keypad, pointing device), and a communication interface 607 (e.g., modem, a network interface (such as an Ethernet card), a communications port, or a PCMCIA slot and card). The main memory 603 may store instructions that when executed by the one or more processors 601 cause the one or more processors 601 to perform one or more process blocks of the process 800 and the process 900.

The communication interface 607 allows software and data to be transferred between the computer system and external devices. The system 600 further includes a communications infrastructure 608 (e.g., a communications bus, cross-over bar, or network) to which the aforementioned devices/modules 601 through 607 are connected.

Information transferred via communications interface 607 may be in the form of signals such as electronic, electromagnetic, optical, or other signals capable of being received by communications interface 607, via a communication link that carries signals and may be implemented using wire or cable, fiber optics, a phone line, a cellular phone link, a radio frequency (RF) link, and/or other communication channels. Computer program instructions representing the block diagram and/or flowcharts herein may be loaded onto a computer, programmable data processing apparatus, or processing devices to cause a series of operations performed thereon to produce a computer implemented process. In one embodiment, processing instructions for one or more process blocks of process 800 (FIG. 8) may be stored as program instructions on the memory 603, storage device 604 and the removable storage device 605 for execution by the processor 601.

Embodiments have been described with reference to flowchart illustrations and/or block diagrams of methods, apparatus (systems) and computer program products. Each block of such illustrations/diagrams, or combinations thereof, can be implemented by computer program instructions. The computer program instructions when provided to a processor produce a machine, such that the instructions, which execute via the processor create means for implementing the functions/operations specified in the flowchart and/or block diagram. Each block in the flowchart/block diagrams may represent a hardware and/or software module or logic. In alternative implementations, the functions noted in the blocks may occur out of the order noted in the figures, concurrently, etc.

The terms "computer program medium," "computer usable medium," "computer readable medium", and "computer program product," are used to generally refer to media such as main memory, secondary memory, removable storage drive, a hard disk installed in hard disk drive, and signals. These computer program products are means for providing software to the computer system. The computer readable medium allows the computer system to read data, instructions, messages or message packets, and other computer readable information from the computer readable medium. The computer readable medium, for example, may include non-volatile memory, such as a floppy disk, ROM, flash memory, disk drive memory, a CD-ROM, and other permanent storage. It is useful, for example, for transporting information, such as data and computer instructions, between computer systems. Computer program instructions may be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

As will be appreciated by one skilled in the art, aspects of the embodiments may be embodied as a system, method or computer program product. Accordingly, aspects of the embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the embodiments may take the form of a computer program product embodied in one or more computer readable medium(s) having computer readable program code embodied thereon.

Any combination of one or more computer readable medium(s) may be utilized. The computer readable medium may be a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Computer program code for carrying out operations for aspects of one or more embodiments may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of one or more embodiments are described above with reference to flowchart illustrations and/or block diagrams of methods, apparatus (systems) and computer program products. It will be understood that each block of the flowchart illustrations and/or block diagrams, and combinations of blocks in the flowchart illustrations and/or block diagrams, can be implemented by computer program instructions. These computer program instructions may be provided to a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various embodiments. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

References in the claims to an element in the singular is not intended to mean "one and only" unless explicitly so stated, but rather "one or more." All structural and functional equivalents to the elements of the above-described exemplary embodiment that are currently known or later come to be known to those of ordinary skill in the art are intended to be encompassed by the present claims. No claim element herein is to be construed under the provisions of 35 U.S.C. section 112, sixth paragraph, unless the element is expressly recited using the phrase "means for" or "step for."

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the embodiments has been presented for purposes of illustration and description, but is not intended to be exhaustive or limited to the embodiments in the form disclosed. Many modifications and variations will be apparent to those of ordinary skill in the art without departing from the scope and spirit of the invention.

Though the embodiments have been described with reference to certain versions thereof; however, other versions are possible. Therefore, the spirit and scope of the appended claims should not be limited to the description of the preferred versions contained herein.

What is claimed is:

1. A wireless microphone, comprising:
    a microphone body comprising:
        a housing section including:
            an interior space maintaining an electronics assembly of the wireless microphone;
            an outer surface; and
            a recess recessed in a part of the outer surface of the housing section; and
        a first cover section, wherein the first cover section is a sleeve detachably coupled to the outer surface of the housing section to enclose the outer surface of the housing section;
    a plurality of antennas positioned at different locations of the microphone body, wherein each of the plurality of antennas is configured to wirelessly transmit data, and at least one of the plurality of antennas is disposed inside the recess, such that the at least one antenna lies flush with one or more remaining parts of the outer surface of the housing section and is enclosed by the first cover section;
    a sensor configured to detect an object within proximity of an antenna of the plurality of antennas that obstructs the antenna; and
    a controller configured to switch antenna operation of the wireless microphone from the antenna to another antenna of the plurality of antennas in response to the object detected.

2. The wireless microphone of claim 1, wherein the plurality of antennas comprises:
    a first antenna positioned proximate to a bottom end of the microphone body; and
    a second antenna disposed inside the recess, wherein the recess is proximate to a top end of the microphone body.

3. The wireless microphone of claim 2, wherein:
    the electronics assembly of the wireless microphone comprises one or more electronic components that enable operation of the wireless microphone; and
    the first cover section is comprised of non-conductive material.

4. The wireless microphone of claim 3, wherein the recess is etched into the part of the outer surface of the housing section.

5. The wireless microphone of claim 4, wherein the second antenna comprises a flexible printed circuit board (PCB) including a planar array of microstrip antenna elements integrated in a ground plane, the flexible PCB is sized and shaped to fit inside the recess and match a curvature of the recess and an interior of the first cover section, the flexible PCB is wrapped around the part of the outer surface of the housing section, and the flexible PCB is sandwiched in between the interior of the first cover section and the outer surface of the housing section.

6. The wireless microphone of claim 4, wherein the microphone body further comprises:
    a second cover section of conductive material, wherein the second cover section detachably coupled to a bottom end of the outer surface of the housing section to enclose a part of the microphone body not enclosed by the first cover section, and the second cover section extends lengthwise beyond the housing section; and
    a third cover section of non-conductive material, wherein the third cover section is detachably coupled to a bottom end of the second cover section, the third cover section forms the bottom end of the microphone body, and the first antenna is disposed inside the third cover section.

7. The wireless microphone of claim 2, wherein the first antenna is a primary antenna for the wireless microphone, and the second antenna is a secondary antenna for the wireless microphone.

8. The wireless microphone of claim 1, wherein the sensor comprises a touch sensor.

9. The wireless microphone of claim 1, wherein the sensor comprises a proximity sensor.

10. The wireless microphone of claim 1, wherein the controller is further configured to:
monitor performance of at least one antenna of the plurality of antennas based on: signal quality of a communication link with the at least one antenna, and sensor information captured by the sensor and indicative of an object within proximity of the at least one antenna that obstructs the at least one antenna; and
switch the antenna operation of the wireless microphone between the plurality of antennas based on the performance.

11. A wireless microphone system, comprising:
a microphone body comprising:
a housing section including:
an interior space maintaining an electronics assembly of the wireless microphone;
an outer surface; and
a recess recessed in a part of the outer surface of the housing section; and
a first cover section, wherein the first cover section is a sleeve to detachably coupled to the outer surface of the housing section to enclose the outer surface of the housing section;
a first antenna and a second antenna positioned at different locations of the microphone body, wherein the second antenna is disposed inside the recess, such that the second antenna lies flush with one or more remaining parts of the outer surface of the housing section and is enclosed by the first cover section;
a sensor configured to capture sensor information indicative of an object within proximity of an antenna of the wireless microphone system that obstructs the antenna; and
a controller configured to switch antenna operation of the wireless microphone system between the first antenna and the second antenna based on the sensor information;
wherein each antenna of the wireless microphone system is configured to wirelessly transmit data.

12. The wireless microphone system of claim 11, wherein the first antenna is positioned proximate to a bottom end of the microphone body, and the recess is proximate to a top end of the microphone body.

13. The wireless microphone system of claim 11, wherein:
the electronics assembly of the wireless microphone comprises one or more electronic components that enable operation of the wireless microphone system; and
the first cover section is comprised of non-conductive material.

14. The wireless microphone system of claim 13, wherein the recess is etched into the part of the outer surface of the housing section.

15. The wireless microphone system of claim 14, wherein the second antenna comprises a flexible printed circuit board (PCB) including a planar array of microstrip antenna elements integrated in a ground plane, the flexible PCB is sized and shaped to fit inside the recess and match a curvature of the recess and an interior of the first cover section, the flexible PCB is wrapped around the part of the outer surface of the housing section, and the flexible PCB is sandwiched in between the interior of the first cover section and the outer surface of the housing section.

16. The wireless microphone system of claim 14, wherein the microphone body further comprises:
a second cover section of conductive material, wherein the second cover section detachably coupled to a bottom end of the outer surface of the housing section to enclose a part of the microphone body not enclosed by the first cover section, and the second cover section extends lengthwise beyond the housing section; and
a third cover section of non-conductive material, wherein the third cover section is detachably coupled to a bottom end of the second cover section, the third cover section forms the bottom end of the microphone body, and the first antenna is disposed inside the third cover section.

17. The wireless microphone system of claim 11, wherein the sensor comprises a touch sensor.

18. The wireless microphone system of claim 11, wherein the sensor comprises a proximity sensor.

19. The wireless microphone system of claim 11, wherein the controller is further configured to:
monitor performance of at least one antenna of the first antenna and the second antenna based on: signal quality of a communication link with the at least one antenna, and sensor information captured by the sensor and indicative of an object within proximity of the at least one antenna that obstructs the at least one antenna; and
switch the antenna operation of the wireless microphone between the first antenna and the second antenna based on the performance.

20. A method, comprising:
detecting, via a sensor, an object within proximity of a first antenna of a wireless microphone that obstructs the first antenna; and
switching antenna operation of the wireless microphone from the first antenna to a second antenna of the wireless microphone in response to the object detected;
wherein the wireless microphone comprises a microphone body comprising:
a housing section including:
an interior space maintaining an electronics assembly of the wireless microphone;
an outer surface; and
a recess recessed in a part of the outer surface of the housing section; and
a first cover section, wherein the first cover section is a sleeve to-detachably coupled to the outer surface of the housing section to enclose the outer surface of the housing section; and
wherein the first antenna and the second antenna are positioned at different locations of the wireless microphone, and the second antenna is disposed inside the recess, such that the second antenna lies flush with one or more remaining parts of the outer surface of the housing section and is enclosed by the first cover section.

* * * * *